United States Patent [19]

Pouplier

[11] Patent Number: 5,127,679
[45] Date of Patent: Jul. 7, 1992

[54] FLUID-TIGHT CONNECTOR FOR FLUID-CONVEYING PIPE-LINES

[75] Inventor: Christian Pouplier, Le Mans, France

[73] Assignee: Simmons S.A., France

[21] Appl. No.: 649,571

[22] Filed: Feb. 1, 1991

[30] Foreign Application Priority Data

Feb. 5, 1990 [FR] France .................. 90 01304

[51] Int. Cl.⁵ ............................................. F16L 21/08
[52] U.S. Cl. .......................................... 285/92; 285/86
[58] Field of Search ................ 285/92, 86, 82, 85, 285/80

[56] References Cited

U.S. PATENT DOCUMENTS

| | | | |
|---|---|---|---|
| 673,572 | 5/1901 | Barrow | 285/92 |
| 1,393,057 | 10/1921 | Vollmer | 285/92 |
| 2,499,104 | 2/1950 | Lovell | 285/92 |
| 2,934,359 | 4/1960 | Smisko et al. | 285/86 |
| 3,201,149 | 8/1965 | Bragg | 285/86 |
| 4,693,498 | 9/1987 | Baugh et al. | 285/92 |
| 5,016,920 | 5/1991 | Anderson | 285/92 |

FOREIGN PATENT DOCUMENTS

| | | | |
|---|---|---|---|
| 718791 | 9/1965 | Canada | 285/96 |
| 2610878 | 7/1976 | Fed. Rep. of Germany . | |
| 917287 | 12/1946 | France . | |
| 352880 | 12/1937 | Italy | 285/86 |
| 593413 | 5/1959 | Italy | 285/86 |
| 319710 | 9/1929 | United Kingdom | 285/92 |
| 624386 | 8/1949 | United Kingdom . | |

Primary Examiner—Eric K. Nicholson
Attorney, Agent, or Firm—Ostrolenk, Faber, Gerb & Soffen

[57] ABSTRACT

A fluit-tight connector comprising two members with respectively concave and convex co-operating mating ends and joined together by an internally threaded sleeve retaining one of the members and tightened by being screwed onto the other member by means of a bush externally coaxial with the sleeve and comprising an inner toothing co-operating with the outer periphery of the sleeve, the bush having such a length that after screwing of the sleeve and axial sliding of the bush over the sleeve it covers and engages with its inner toothing the outer periphery of one member for locking this member as well as the sleeve against rotation.

2 Claims, 2 Drawing Sheets

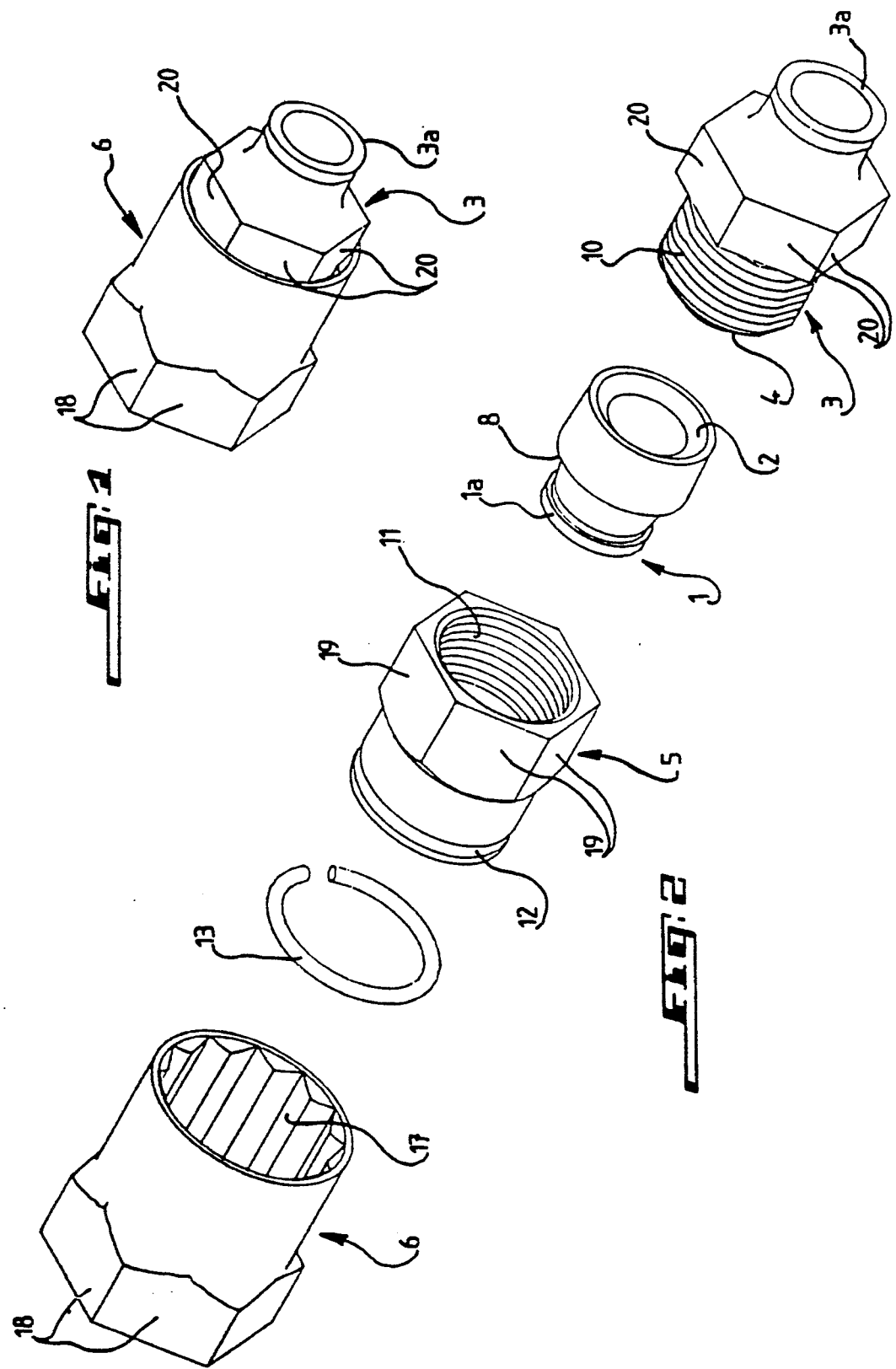

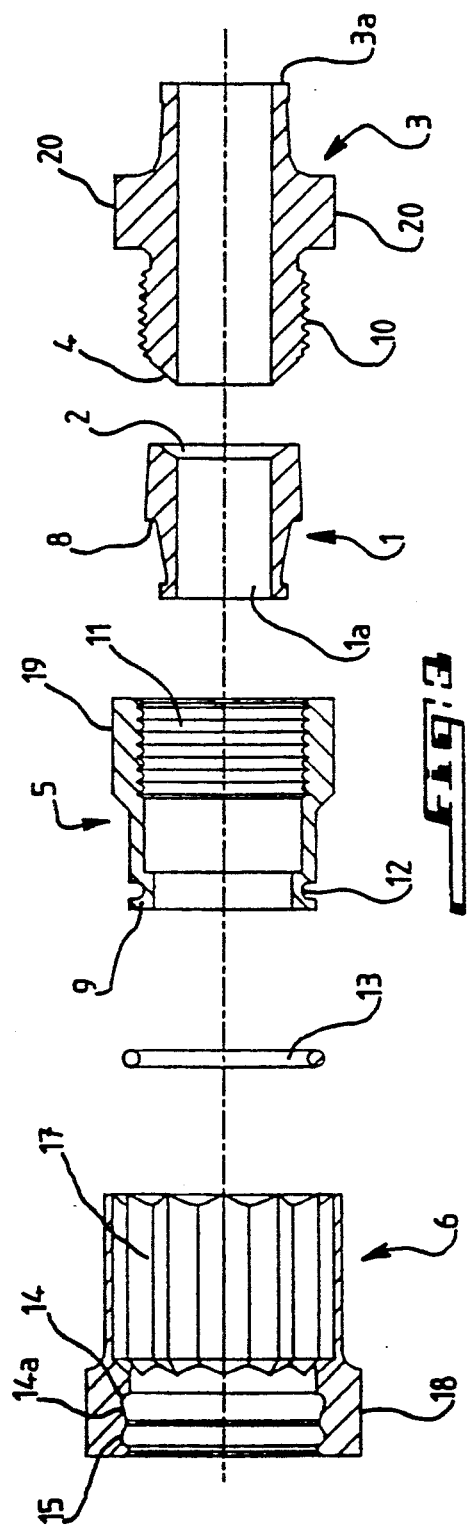
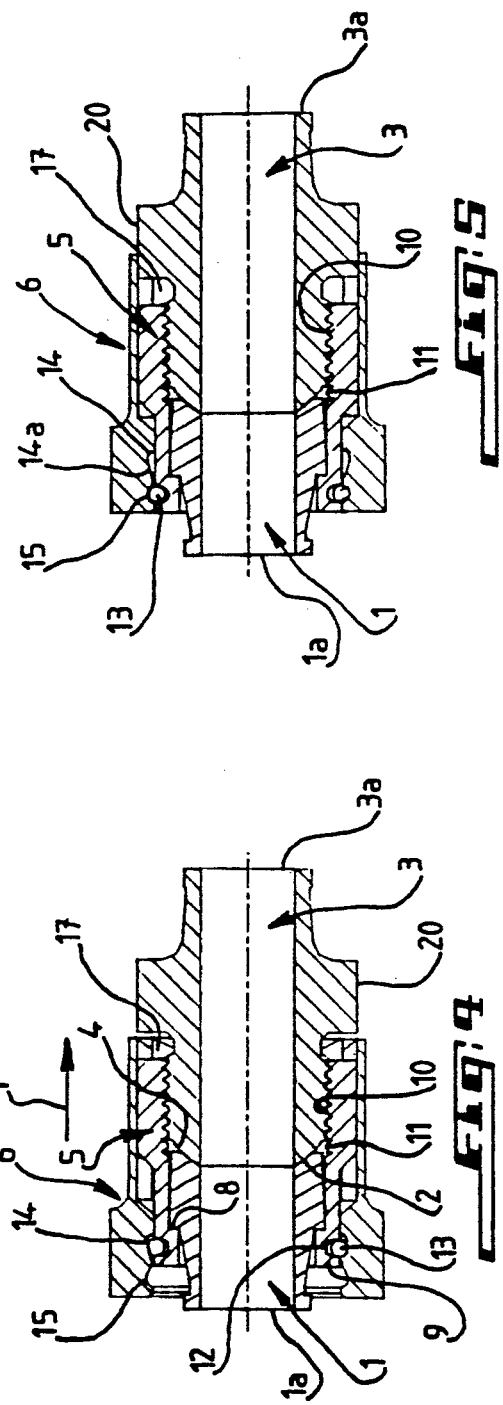

FLUID-TIGHT CONNECTOR FOR FLUID-CONVEYING PIPE-LINES

The present invention relates essentially to an improved fluid-tight connector, coupling or like fitting for pipe-lines in which may flow any fluid whatsoever such for instance as fuel e.g. in an engine of an automotive vehicle.

There are already known connection devices for coupling pipes essentially comprising two parts with respectively convex and concave co-operating mating or complementary ends and joined together by an internally threaded sleeve retaining one of the parts and tightened by being screwed onto the other part.

In order to provide after tightening for the locking of the parts forming the connector there was generally used a locking wire extending through the connector but this suffered from inconveniences. When indeed the connector is stressed or strained by vibrations for instance the locking wire may break in the course of time so that the connector becomes untightened. It therefore produces leaks and this may be dangerous and incurs the risk of causing a fire hazard especially when the pipe-lines are carrying an inflammable fluid.

Therefore the object of the present invention is to provide an improved fluid-tight connector which copes with the above-mentioned inconveniences and which remains perfectly fluid-tight and unlosenable unless purposely losening or untightening said connector.

For that purpose the subject matter of the invention is an improved fluid-tight connector for pipe-lines conveying any fluid whatsoever and of the type comprising two parts with respectively convex and concave co-operating mating or complementary ends and joined together by an internally threaded sleeve retaining one of the parts and tightened by being screwed onto the other part, characterized in that the said sleeve is screwed and tightened onto the other part by means of a bush externally concentric or coaxial with the sleeve and comprising an inner toothing or the like co-operating with the outer periphery of the sleeve, this bush having such a length that after screwing of the sleeve and axial sliding of the said bush over the sleeve it is caused to cover and to become engaged through its inner toothing with the outer periphery of the said other part for locking this other part as well as the sleeve against rotation.

According to another characterizing feature of this connector the outer peripheries of the sleeve and of the other aforesaid part comprise flat sides adapted to co-operate with the inner toothing of the bush.

According to still another characterizing feature of this connector the outer periphery of the sleeve comprises a groove receiving a keeper ring or the like co-operating with either one of two grooves formed in the inner periphery of the bush.

It should further be pointed out that one of the two grooves formed in the inner periphery of the bush comprises a ramp-like portion facilitating the passage of the keeper ring into the other groove upon the axial sliding of the bush over the sleeve.

According to a preferred examplary embodiment the bush exhibits the shape of an end of a double hexagonal wrench or spanner.

The invention will be better understood and further objects, characterizing features, details and advantages thereof will appear more clearly as the following explanatory description proceeds with reference to the accompanying diagrammatic drawings given by of non limiting example only illustrating a presently preferred specific embodiment of the invention and wherein:

FIG. 1 is a perspective view of a fluid-tight connector according to this invention in the mounted or assembled position;

FIG. 2 is an exploded perspective view of this connector;

FIG. 3 is an exploded view in axial section of said connector;

FIG. 4 is a view in axial section of the connector in the screwed and tightened position of the component parts thereof; and FIG. 5 is a view similar to FIG. 4 but showing the connector in the final position locking its component parts against rotation.

According to the examplary embodiment shown in the Figures there is seen that a connector according to the principles of this invention essentially comprises a first member 1 with a concave end 2, a second member 3 with a convex end 4 mating with or complementary of the concave end 2 of the member 1, a sleeve 5 retaining the member 1 and screwed onto the member 3 and a bush externally concentric or coaxial with the sleeve 5 and allowing this sleeve 5 to be screwed onto the member 3 as well as this member 3 and the sleeve 5 to be locked against rotation after having been screwed onto each other.

The first member 1 comprises an end 1a opposite to its concave end 2 and onto which is secured as by welding for instance a pipe portion to be coupled. This member 1 comprises a shoulder 8 allowing the member to be retained within the sleeve 5 which comprises for that purpose a collar 9 at one of its ends.

The second member 3 comprises an end 3a opposite to the convex end 4 and onto which is secured as by welding for instance another pipe portion (not shown) to be coupled.

This second member 3 comprises an external threading 10 which may co-operate by screwing with an internally threaded portion 11 of the sleeve 5.

This sleeve 5 comprises adjacent to the collar 9 an annular groove 12 in which is accommodated a keeper or retaining ring or the like 13.

The bush 6 comprises inside and in the vicinity of one of its ends two successive grooves 14, 15 adapted to co-operate with the keeper ring 13 as shown on FIGS. 4 and 5 and as will be described in more detail later in connection with the operation.

One of these two grooves, namely the groove 14 comprises a ramp-like portion 14a which is well seen on FIG. 3 and facilitates the passage of the keeper ring 13 into the other groove 15 under the effect of the axial sliding of the bush 6 over the sleeve 5 as is understandable upon successively considering FIGS. 4 and 5.

The bush 6 comprises an inner toothing designated at 17 and exhibits according to the examplary embodiment shown the general shape of an end of a double hexagonal wrench or spanner. At 18 are shown flat sides which for instance are in a number of six, which are provided on the outer periphery of the bush 6 and which allow by means of a suitable tool to rotate the bush 6 and therefore to rotate and to screw the sleeve 5 onto the member 3. The inner toothing 17 indeed of the bush 6 will automatically engage the flat sides 19 provided on the outer periphery of the sleeve 5.

It should also be pointed out that the member 3 also comprises on the outside flat sides designated at 20, these flat sides following the threading 10 of the said member 3.

The use or working and the operation of the connector just described will be set forth hereinafter with reference more particularly to FIGS. 4 and 5.

The first member 1 is at first inserted into the sleeve 5 which comprises the keeper ring 13, it being understood that one of the pipe portions to be coupled will be secured as by welding for instance onto the end 1a of the member 1.

Then the member 3 is screwed with its threading 10 into the sleeve 5 and this through co-operation of the threading 10 with the threading 11.

The screwing of the sleeve 5 is carried out by rotating the bush 6 the groove 14 of which is in engagement with the keeper ring 13 as well seen on FIG. 4 and this until the concave and convex ends 2 and 4 of both members 1 and 3 are caused to abut each other and to be properly tightened against one another.

This having been done the bush 6 is subjected to a translatory motion according to the arrow F so that the keeper ring 13 owing to the ramp-like portion 14a will escape the groove 14 to pass into the groove 15 as well seen on FIG. 5.

It should be noted here that the bush 6 has such a length that after the translatory motion and axial sliding over the sleeve 5 it covers the member 3 as well seen on FIG. 5. More specifically the inner toothing 17 having a double hexagonal or other shape of the bush 6 would automatically engage the flat sides 20 of the member 3 so that at last the bush provides for the locking of the member 3 and of the sleeve 5 against rotation since as already stated the inner toothing 17 of the bush 6 will engage the flat sides 19 and 20 of the sleeve 5 and of the member 3, respectively.

There has therefore been provided according to the invention an improved connector the fluid-tightness of which is not likely to be altered or impaired since the locking against rotation of the member 3 remaining in bearing engagement with the member 1 and of the sleeve 5 is provided by the bush 6 which has a double function, namely a function of operating rotation for effecting the screwing of the sleeve 5 onto the member 3 and a function of locking of said sleeve and of the member 3 against rotation after an axial translatory motion of the bush 6 as previously explained.

It should be understood that the invention is not at all limited to the embodiment described and illustrated which has been given by way of example only.

Thus the inner toothing of the bush could exhibit a configuration differing from that of a double hexagonal shape shown. Likewise the flat sides provided on the outer peripheries of the sleeve 5 and of the member 3 could have another shape than that shown and adapted to co-operate with the inner toothing of the bush.

Therefore the invention comprises all the technical equivalents of the means described as well as their combinations if the latter are carried out according to its gist and within the scope of the appended claims.

What is claimed is:

1. A fluid-tight connector for fluid-carrying pipelines, comprising two members with respectively convex and concave co-operating mating ends, the two members being joined together by an internally threaded sleeve, the sleeve retaining one of the members and the sleeve being tightened by being screwed onto the other member, and bush means externally coaxial with the sleeve, the bush means comprising an inner toothing co-operating with the outer periphery of the sleeve, the bush means having a length wherein after screwing of the sleeve and axial sliding of the bush means over the sleeve, the bush means covers and engages with an inner toothing thereof the outer periphery of the other member to lock the other member and the sleeve against rotation, and wherein the outer periphery of the sleeve comprises a groove receiving a keeper ring co-operating with either one of two grooves formed in the inner periphery of the bush means.

2. A connector according to claim 1, wherein one of the two grooves formed in the inner periphery of the bush comprises a ramp-like portion facilitating passage of the keeper ring into the other groove upon the axial sliding of the bush over the sleeve.

* * * * *